United States Patent [19]

Fry et al.

[11] Patent Number: 4,893,704

[45] Date of Patent: Jan. 16, 1990

[54] POWER DOOR LOCK ACTUATOR

[75] Inventors: Timothy J. Fry, Spring Valley; Lowell T. Greentaner, Huber Heights, both of Ohio

[73] Assignee: General Motors Corporation, Detroit, Mich.

[21] Appl. No.: 328,992

[22] Filed: Mar. 27, 1989

[51] Int. Cl.[4] ....................... E05B 47/00; F16H 27/02; F16H 29/20

[52] U.S. Cl. .................................. 192/141; 74/89.15; 74/625; 192/143; 292/201; 292/336.3; 292/DIG. 62

[58] Field of Search ............... 192/141, 143; 74/89.15, 74/424.8 B, 625; 292/336.3, 201, DIG. 62

[56] References Cited

U.S. PATENT DOCUMENTS

| | | | |
|---|---|---|---|
| 3,710,632 | 1/1973 | Tucker | 74/89.15 |
| 4,093,289 | 6/1978 | Inabayashi et al. | 292/336.3 |
| 4,135,377 | 1/1979 | Kleefeldt et al. | 292/201 X |
| 4,573,723 | 3/1986 | Morita et al. | 292/336.3 |
| 4,674,781 | 6/1987 | Reece et al. | 292/336.3 |
| 4,706,512 | 11/1987 | McKernon et al. | 74/405 |
| 4,708,378 | 11/1987 | Ingenhoven | 74/625 X |

*Primary Examiner*—Rodney H. Bonck
*Attorney, Agent, or Firm*—Patrick M. Griffin

[57] ABSTRACT

A power door lock actuator avoids back driving the motor during manual operation through the use of main and secondary shafts with opposed external threads that cooperate to send a drive member to a neutral position without changing the direction of the motor.

3 Claims, 8 Drawing Sheets

POWER DOOR LOCK ACTUATOR

This invention relates to vehicle door locks in general, and specifically to an actuator for a power door lock system.

BACKGROUND OF THE INVENTION

Power door lock systems in which an operator need do nothing more than push a button to lock or unlock a vehicle door have been in use for some time. There are several design choices for the actuator. Solenoids are possible, but are often too loud. Therefore, electric motor drives have found increasing acceptance. A potential drawback of motor drives is that if the motor drive shaft and lock rod are directly interconnected, manual operation of the lock rod would back drive the motor. Therefore, many designs for centrifugal clutches and for lost motion devices have been proposed. No proposal has met with complete commercial acceptance, and the search is always on for new and different actuators to solve the motor back drive problem.

SUMMARY OF THE INVENTION

The actuator of the invention avoids back drive by providing an automatic return to neutral action after power locking or power unlocking, without the use of a return spring or clutch.

The preferred embodiment of the actuator disclosed is used with a power door lock system of the type that has a reversible motor and an axially slidable look rod that can also be manually moved over a predetermined throw from a lower locked to an upper unlocked position and vice versa. The motor and lock rod are assembled to a housing that forms the main structural framework for the actuator. A main shaft rotated by the motor has an external first stage thread of one hand. A generally barrel shaped secondary shaft is internally threaded so as to move axially back and forth on the main shaft first stage thread. The secondary shaft also has an external second stage thread, of the opposite hand. A shorter, also generally barrel shaped drive member with a pin extending from the side is internally threaded so as to ride axially back and forth on the second stage thread of the secondary drive shaft. The drive member moves back and forth between limit positions defined by first and second bumpers fixed to the secondary shaft. In addition, first and second stop surfaces fixed to the housing define first and second limits of motion for the secondary shaft on the main shaft.

The lock rod includes a first and second catch in the form of closed ends of a slot that are engageable with the drive member pin, which extends through the slot. The location of the ends of the slot is such that, when the drive member is located at its first limit of motion, and the secondary shaft is located at its second limit of motion, then the first slot end is engaged with the drive member pin and the lock rd is in its locked position, defining a power locked-neutral mode of the actuator. When the drive member is located at its second limit of motion, and the secondary shaft is located at its first limit of motion, then the second slot end Is engaged with the drive member pin and the lock rod is in its unlocked position, defining a power unlocked-neutral mode of the actuator.

This location of the slot relative to the drive member secondary shaft means that if the motor runs in one direction when the actuator is in the power locked-neutral mode, the secondary shaft moves up on the first stage thread until it reaches its first limit of motion, taking the drive member and pin with it, and so moving the lock rod up to its unlocked position. At that point, the secondary shaft can move no farther on the first stage thread, and so begins to turn one to one with the main shaft, thereby causing the drive member to move down on the second stage thread to its second limit of motion. At that point, the pin will be back to the second slot end that. Is back to the power unlocked-neutral position. The converse occurs if the actuator is in the power unlocked-neutral mode and the motor runs in the opposite direction whichever neutral mode the actuator is in, the lock rod may be moved manually to the opposite position, which will just move the slot over the pin, without back driving the motor. In addition, suitable lock rod position sensors and circuitry may be added to run the actuator through a phantom power cycle whenever the lock rod is manually moved so as to automatically reset the actuator to the opposite neutral mode. This assures that the actuator will automatically be repositioned and ready to power unlock or lock again.

It is, therefore, a general object of the invention to provide a motor driven power door lock actuate or in which the lock rod may be annually moved without back driving the motor.

It is another object of the invention to provide such an actuator in which the same motor direction that provides power unlocking or locking also sends a drive member back to a neutral mode, from which the lock rod may be manually moved without back driving the motor.

It is yet another object of the invention to provide such an actuator in which the motor directly turns a main shaft with an external first stage thread of one hand, on which a secondary shaft having an external second stage thread of the opposite hand moves between limit positions, and on which, in turn, a lock rod drive member moves between limit positions, so that when the secondary shaft stops moving in one axial direction, it turns with the main shaft to thereby move the drive member in the opposite direction without the main shaft changing direction, thereby returning the actuator to a neutral mode.

It is still another object of the invention to provide such an actuator in which suitable sensors and circuitry sense when the lock rod has been manually moved from a neutral mode, and run the actuator through a phantom cycle to automatically reset the actuator to the other neutral mode.

DESCRIPTION OF THE PREFERRED EMBODIMENT

These and other objects and features of the invention will appear from the following written description, and from the drawings, in which.

Figure 1:
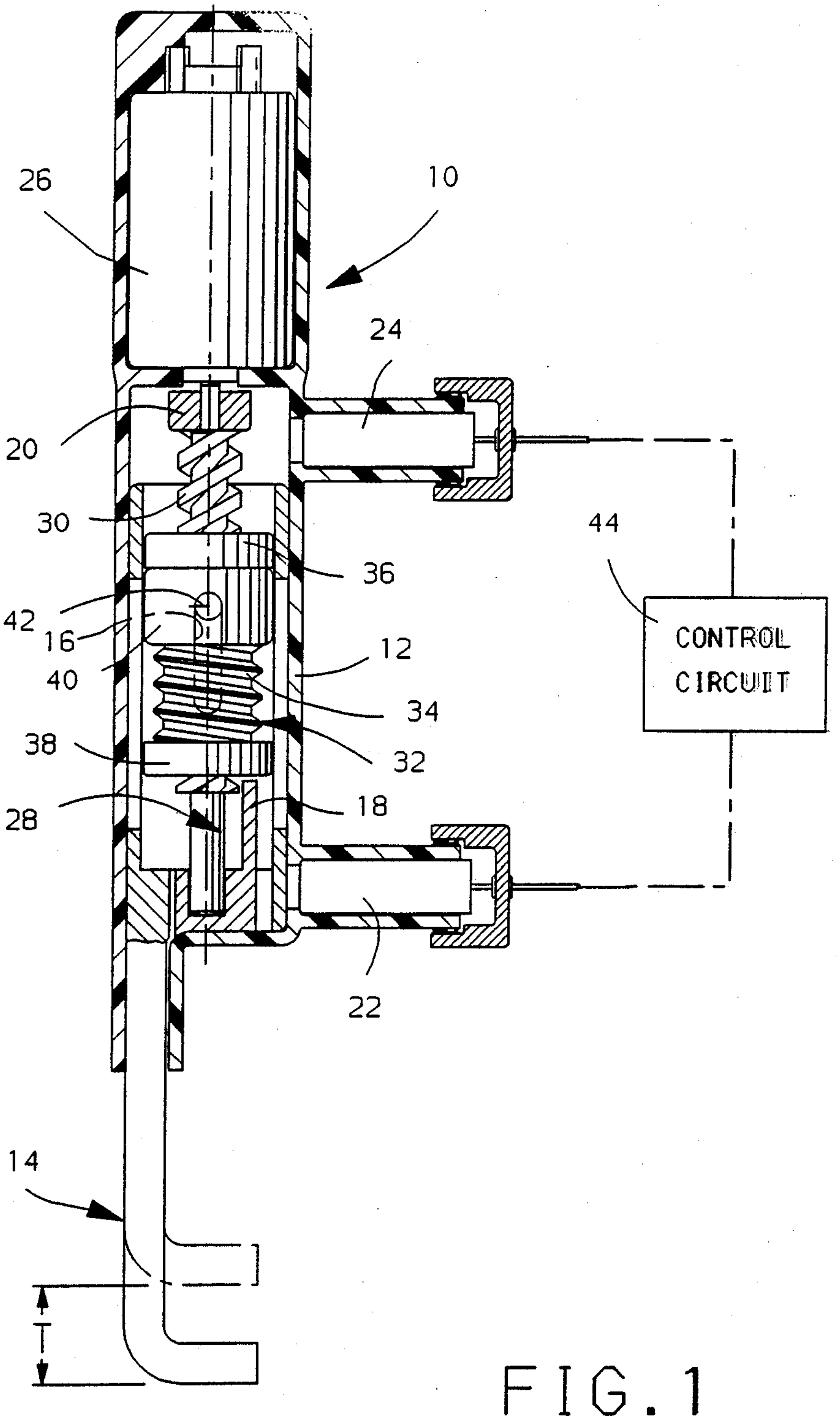
FIG. 1 is a view of a preferred embodiment of the actuator of the invention with the housing in cross section and part of the lock rod cut away to reveal the main shaft, secondary shaft and drive member in elevation, with the lock rod in the down, locked position and the actuator in the power locked neutral mode, and also showing lock rod position sensors and a control circuit schematically.
Figure 2:
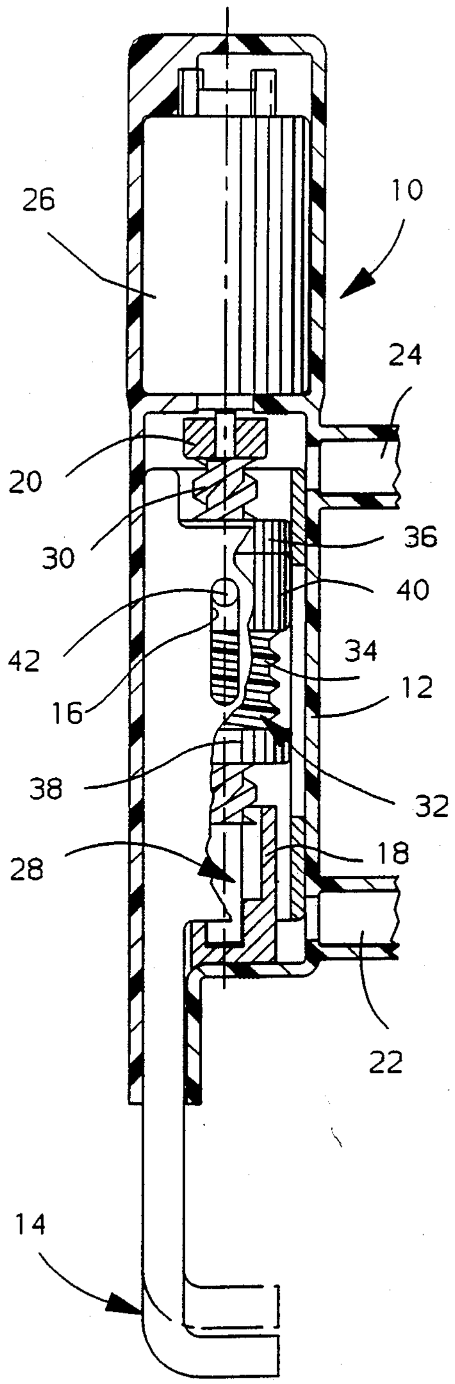
FIG. 2 is a view like FIG. 1, but showing less of the lock rod broken away, so as to illustrate the lock rod slot, and showing the actuator having moved the lock rod about half way up toward the unlocked position.
Figure 3:
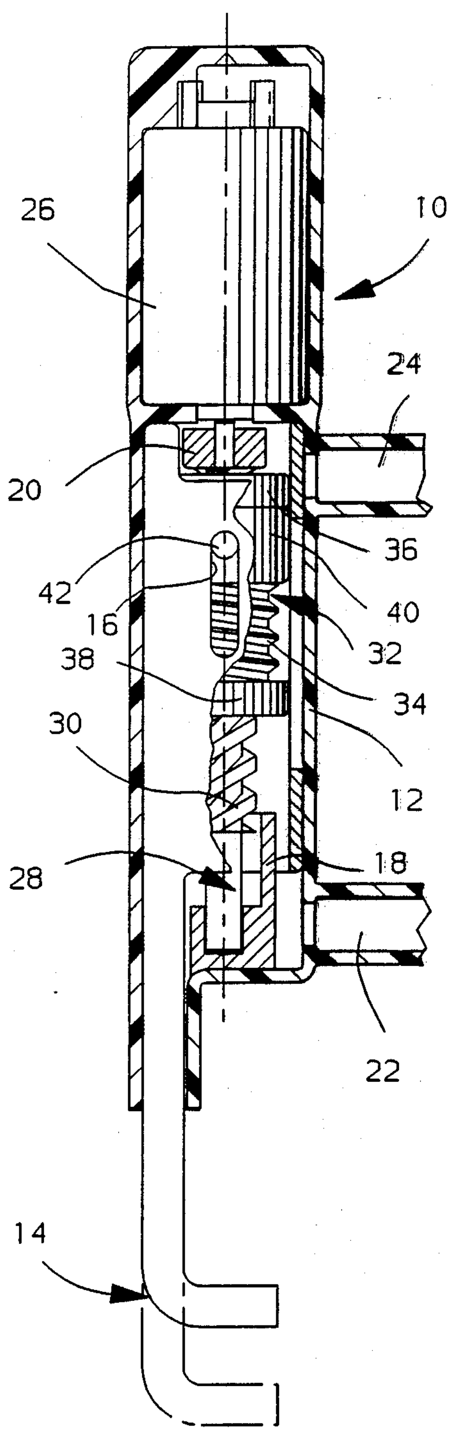
FIG. 3 shows the lock rod all the up to the unlocked position, before the drive member has moved back down.
Figure 4:
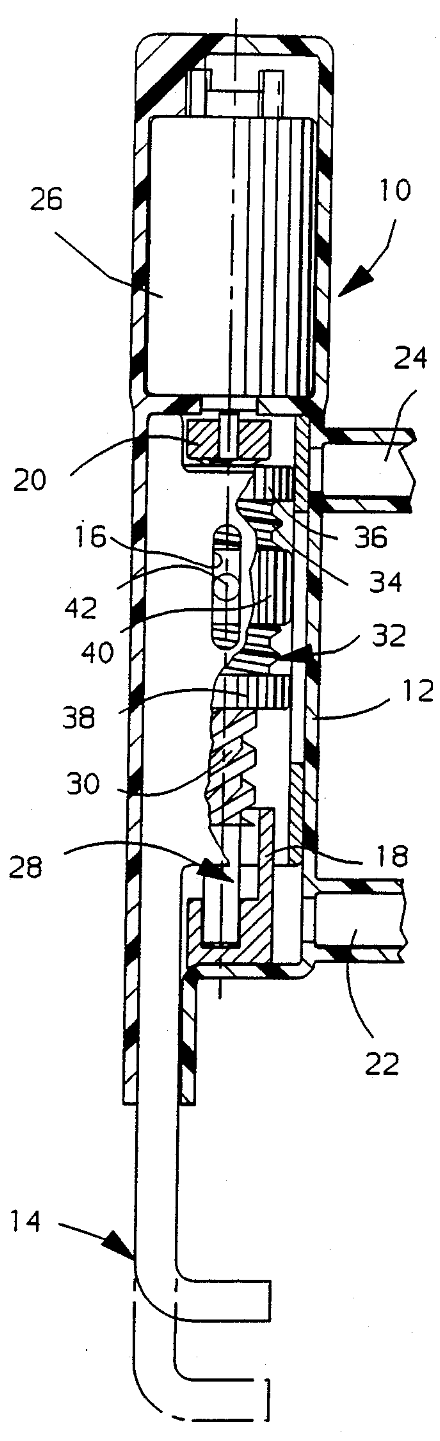
FIG. 4 shows the drive member having moved about half way back down.
Figure 5:
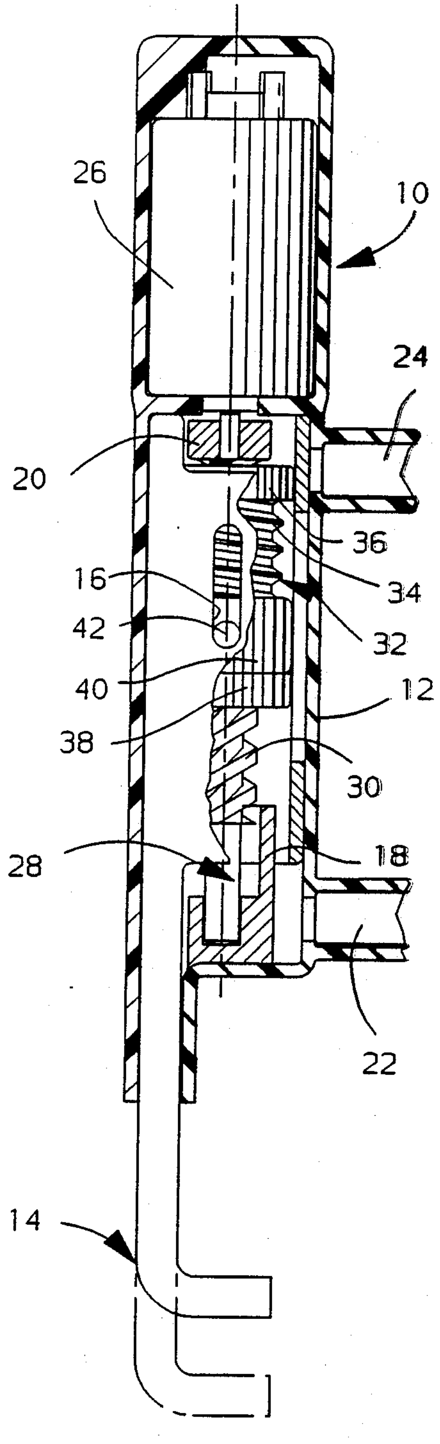
FIG. 5 shows the drive member all the way back down, illustrating the power unlocked neutral mode of the actuator.

Referring first to FIGS. 1 and 2, a preferred embodiment of the power door lock actuator of the invention, indicated generally at 10, includes a vehicle mounted plastic housing 12 which provides the basic structural framework. Housing 12 slidably guides a lock rod, indicated generally at 14, between a lower, locked position, shown in solid lines in FIG. 1, and upper, unlocked position, shown in dotted lines. Lock rod 14, in turn, would operate a conventional door lock, not shown. Lock rod 14 also contains a closed end slot 16, which serves a purpose described below. Lower and upper journal bearings 18 and 20 fixed in housing 12 provide functions described below. Lower and upper position sensors 22 and 24 mounted to the side of housing 12 sense the locked and unlocked positions respectively of lock rod 14 A reversible electric motor 26 would be selectively turned either clockwise or counterclockwise, determined from a reference frame looking up lock rod 14, by an operator with a suitable switch, not illustrated. The operator would read "lock" to turn motor 26 clockwise, and "unlock" to turn it counterclockwise. Motor 26 moves lock rod 14 indirectly, through additional structure of actuator 10, described next.

Still referring to FIGS. 1 and 2, motor 26 turns a main shaft, indicated generally at 28, which is journaled in the bearings 18 and 20, and which has an external first stage thread 30 of right hand. A barrel shaped secondary shaft, indicated generally at 32, is internally threaded over first stage thread 30. Secondary shaft 32 also has an external second stage thread 34 of left hand bordered by an upper disk shaped bumper 36 and a lower disk shaped bumper 38. A drive member in the form of a barrel shaped pin block 40 is internally threaded onto second stage thread 34 between the inner surfaces of the bumpers 36 and 38, which are spaced apart substantially equal to the throw T plus the length of pin block 40. The outer surfaces of the upper and lower bumpers 36 and 38 are bordered by the ends of the upper and lower bearings 20 and 18 respectively, which are spaced apart substantially equal the throw T, plus the length of pin block 40, plus the total thickness of the two bumpers 36 and 38. Finally, a pin 42 extending from the center and side of pin block 40 sticks through lock rod slot 16. The proper location and sizing of slot 16 allows actuator 10 to move lock rod 14, as is described next.

Referring next to FIGS. 1 through 5 and 15, slot 16 has a length approximately equal to the throw T plus the diameter of pin 42. As shown in FIG. 1, and in the corresponding part of FIG. 15, slot 16 is positioned in lock rod 14 relative to the other components of actuator 10 in order that, when lock rod 14 is in its lower, locked position, and when pin block 40 is against the inner surface of upper bumper 36, and the outer surface of lower bumper 38 is against the end of the lower bearing 18, then the pin is at the first, or upper, end of slot 16. This defines what may be referred to as a power locked-neutral mode of actuator 10. Then, when the operator hits the unlock switch, and the main shaft 28 is turned counterclockwise, the secondary shaft 32 moves upwardly on the first stage thread 30. Pin block 40 and pin 42 move up as well, so the upper end of slot 16 acts as a catch that pulls lock rod 14 up, as is shown happening in FIG. 2. The upward motion of secondary shaft 32 on first stage thread 30 is limited, stopped by the contact of the outer surface of the upper bumper 36 with the end of the upper bearing 20, see FIG. 3. At that point, lock rod 14 has moved up by the throw T, to the unlocked position. It the FIG. 3 point, the stopped secondary shaft 32 begins to turn one to one with main shaft 28. Therefore, the opposite hand second stage thread 34 causes the pin block 40 to move in the opposite direction, down on secondary shaft 32, even though main shaft 28 is still turning counterclockwise, see FIG. 4. The downward motion of pin block 40 on secondary shaft 32 is also limited, and stops when its lower end hits the inner surface of the lower bumper 38, FIG. 5. Because of the axial separation of the inner surfaces of the bumpers 36 and 38, which is the length of pin block 40 plus the throw T, pin 42 will have moved down by T at that point. Because of the length of slot 16, T plus the diameter of pin 42, pin 42 will then rest right at the lower end of slot 16, defining what may be termed the power unlocked neutral mode of actuator 10, FIG. 5.

Figure 6:
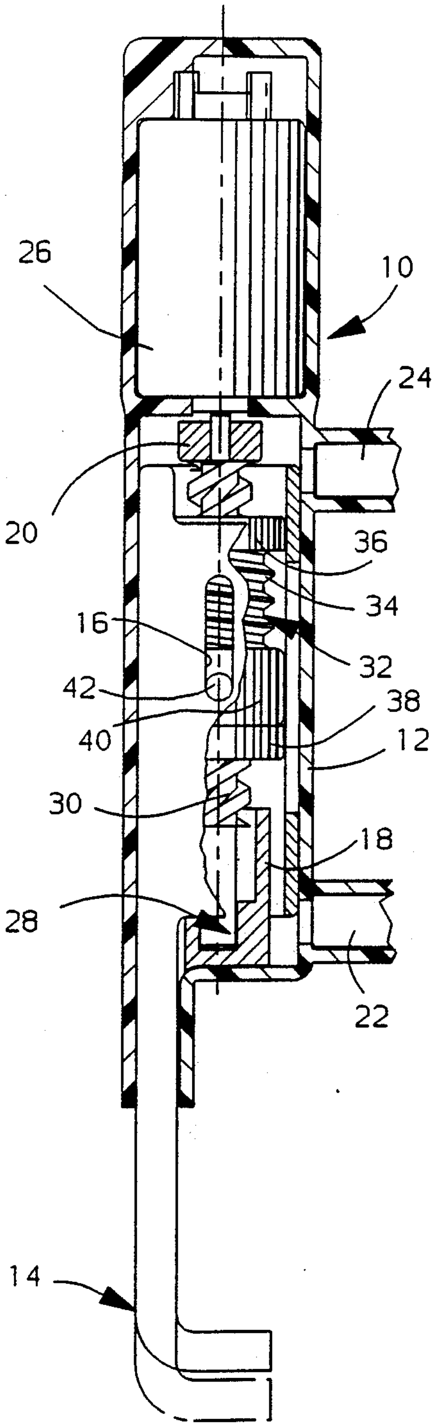
FIG. 6 shows the actuator after it has driven the lock rod about, halfway down toward the locked position.
Figure 7:
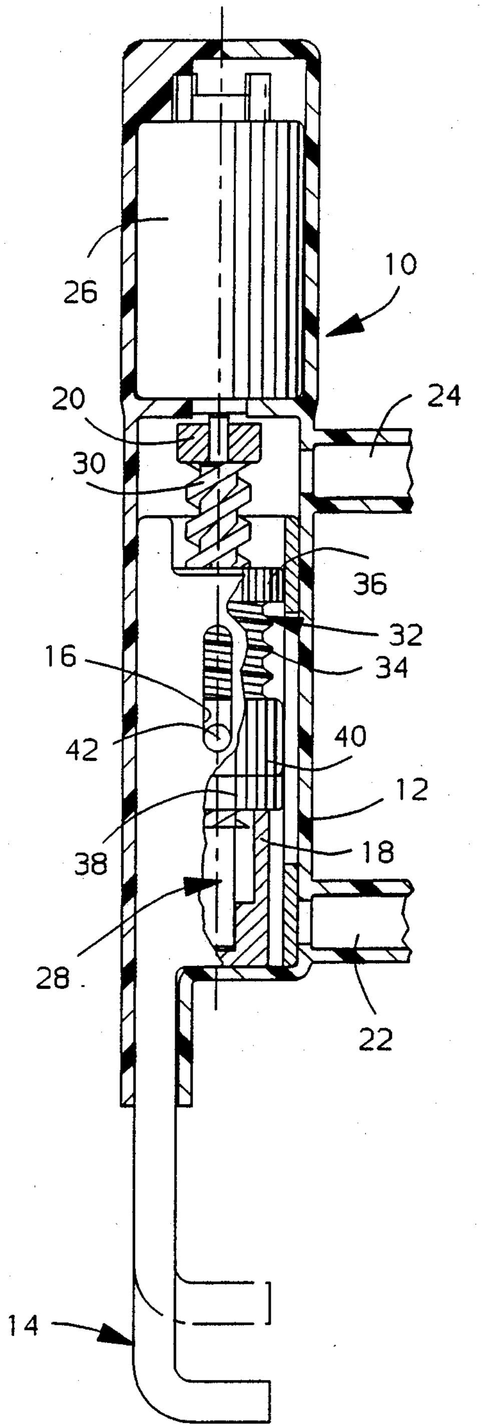
FIG. 7 shows the lock rod at the locked position, before the drive member has moved back up.
Figure 8:
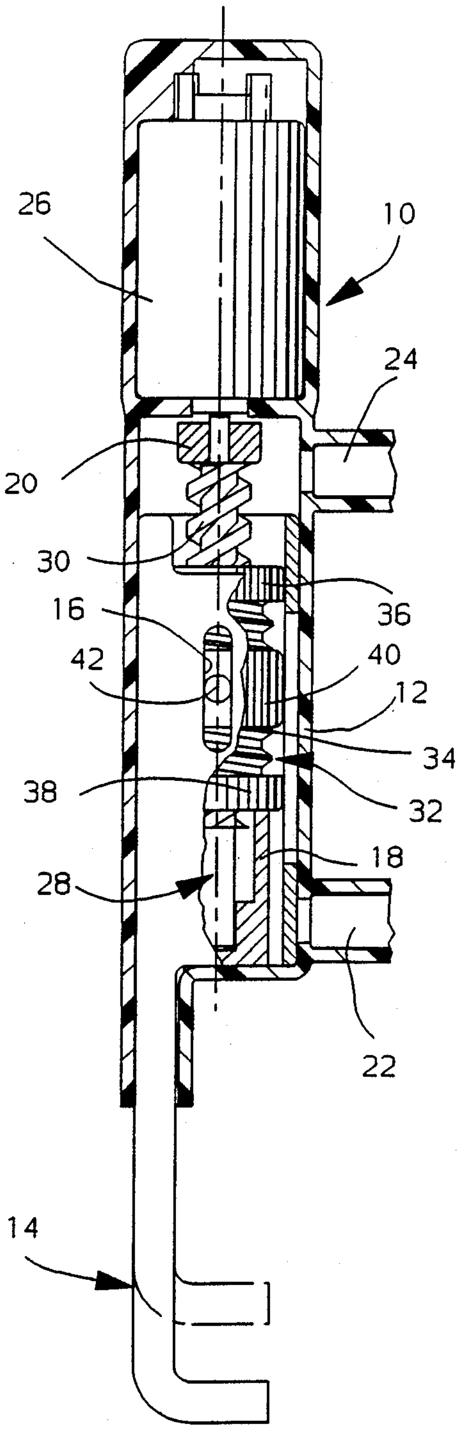
FIG. 8 shows the drive member having moved about halfway back up.

Referring next to FIGS. 6 through 9, with the actuator 10 in the power unlocked-neutral mode the operator would hit the lock switch, causing main shaft 28 to turn clockwise and casing secondary shift 32 to begin to move down on fist stage thread 30, and pulling pin block 40 and lock rod 14 down with it, see Figure 6. The other limit of motion of secondary shaft 32 on main shaft 28 is provided when the outer surface of lower bumper 38 hits the end of lower bearing 18, FIG. 7. Because of the spacing of the ends of the bearings 18 and 20 from each other, which, again, is the throw T, plus the thickness of both bumpers 36 and 38 and the length of pin block 40, lock rod 14 will have moved by the throw T, to the locked position. At the FIG. 7 point, the secondary shaft 32 will begin to turn one to one with the main shaft 28, and the pin block 40 will begin to move up on the second stage thread 34, FIG. 8. The other limit of motion of pin block 40 is set by its upper end hitting the inner surface of the upper bumper 36, FIG. 9. Pin block 40 ill have moved by the throw T by that point, so the pin 42 will rest with at the upper end of slot 16. In conclusion, actuator 10 will have returned to the power locked-neutral mode.

Figure 9:
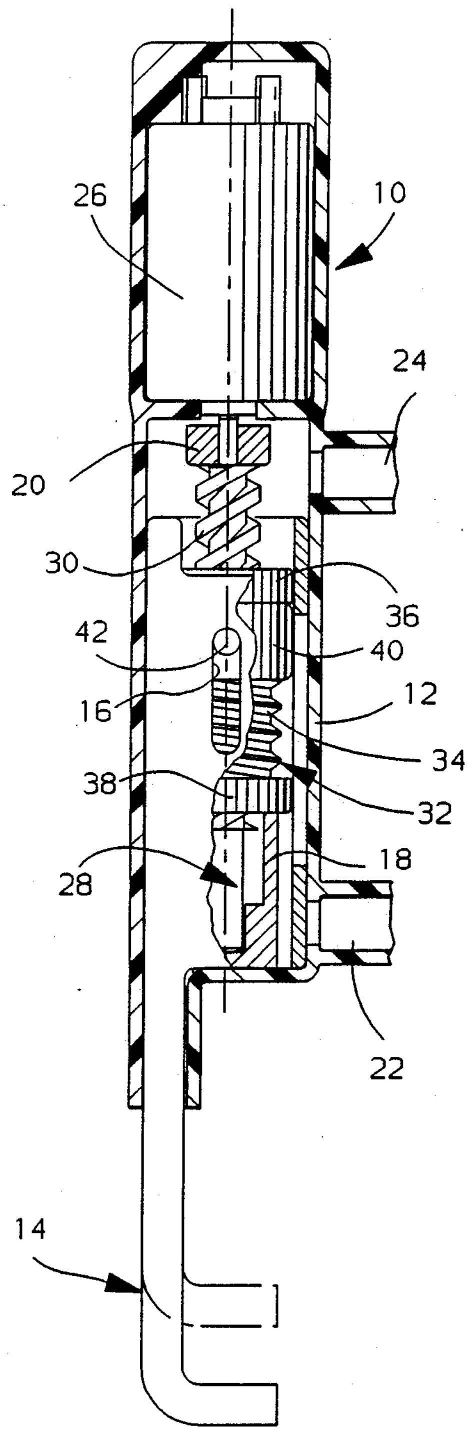
FIG. 9 shows the drive member having moved all the way back up, illustrating the power locked-neutral mode again.
Figure 10:
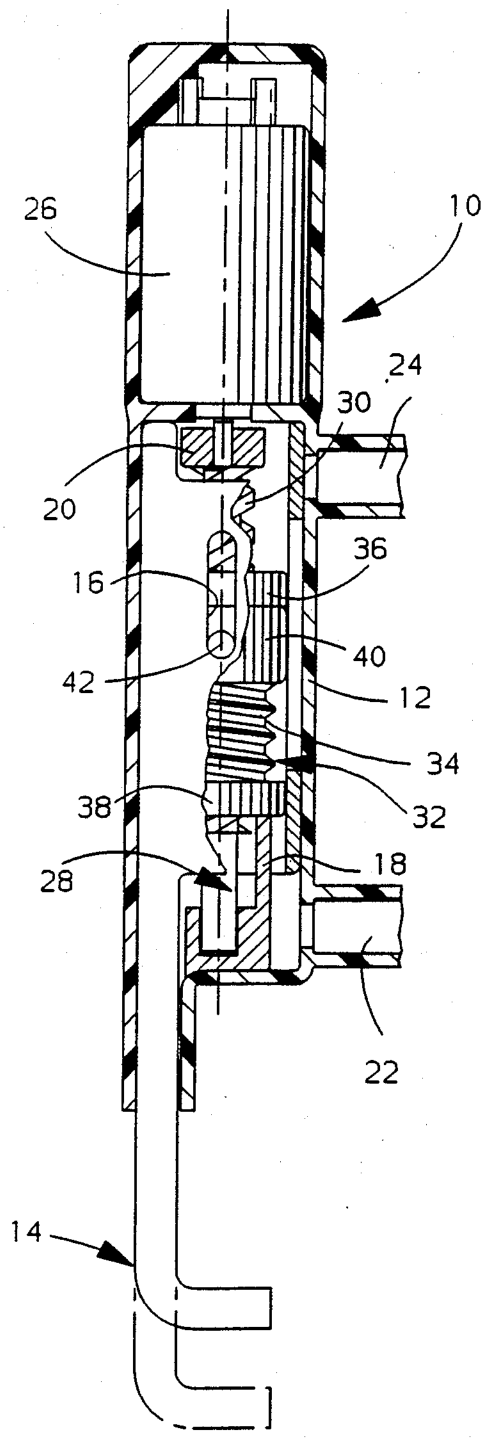
FIG. 10 shows the lock rod having been moved manually up the to unlocked position from the power locked-neutral mode.
Figure 11:
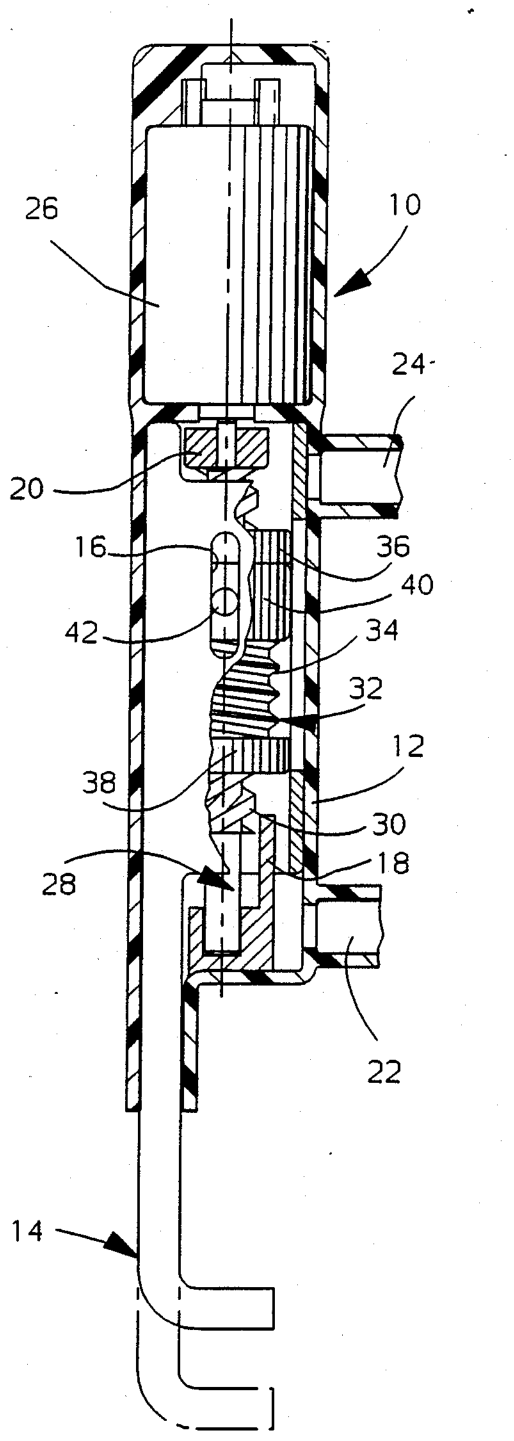
FIGS. 11 through 14 show the actuator moving through a phantom unlocking cycle to reset the actuator to the power unlocked neutral mode, in response to the lock rod having been manually moved from the power locked-mode to the unlocked position.
Figure 12:
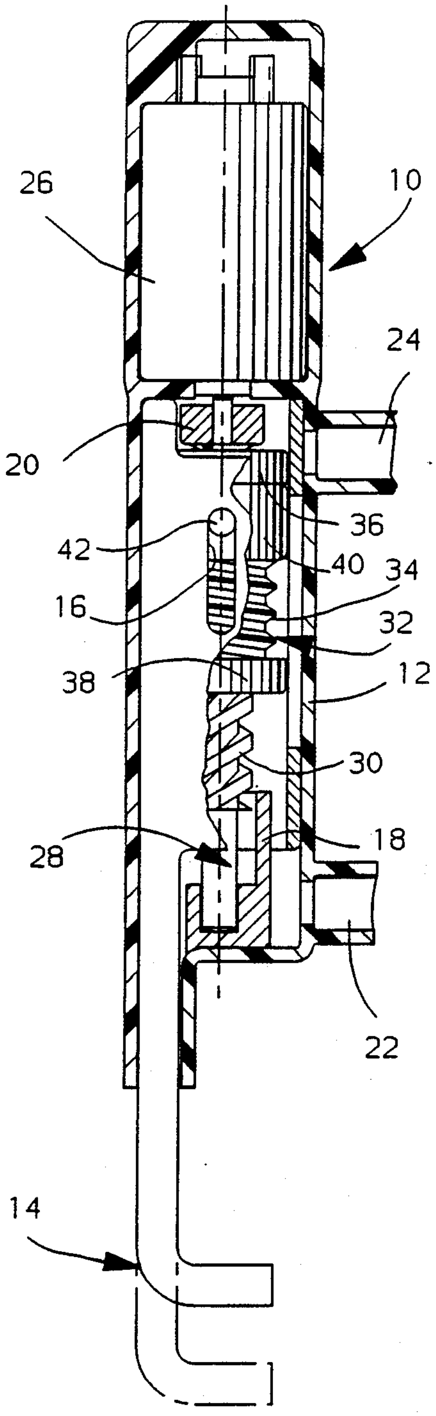
Figure 13:
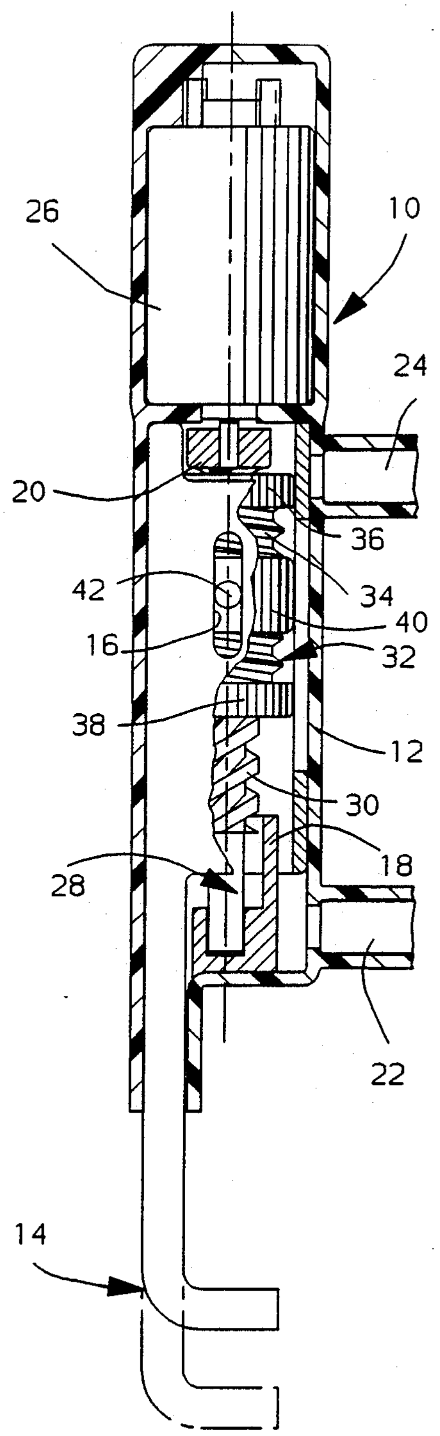
Figure 14:
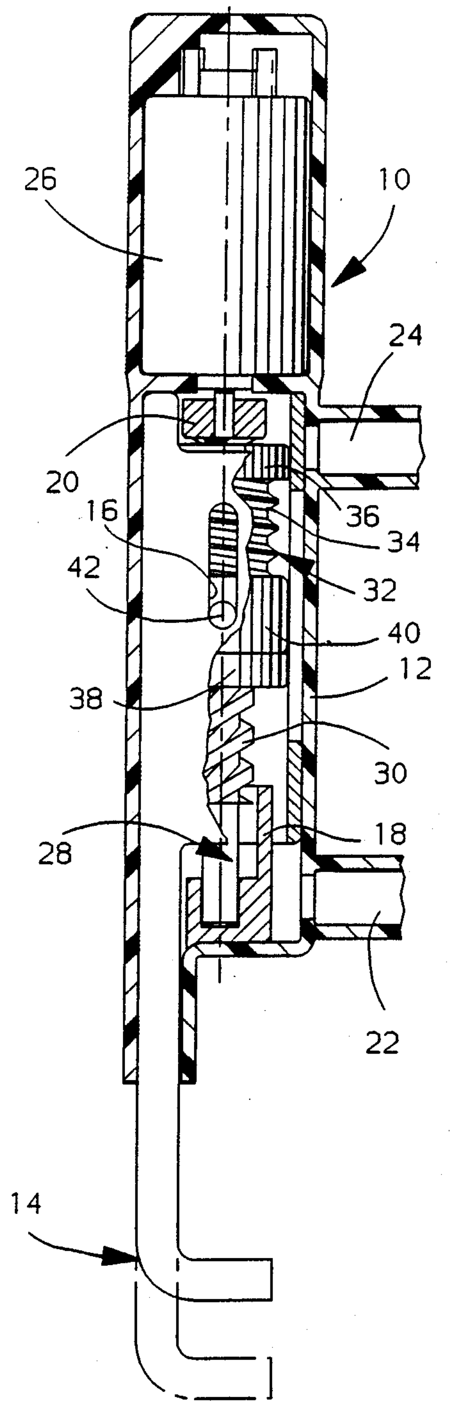
Figure 15:
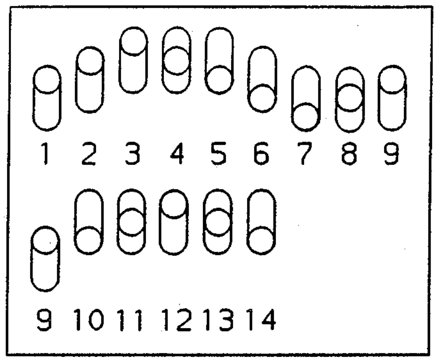
FIG. 15 shows the various slot and pin locations corresponding to FIGS. 1 through 14.

Referring next to FIGS. 9 and 10, the point having actuator 10 return to a neutral mode after powered operation is so that the lock rod 14 may thereafter be manually moved without back driving the motor 26. Lock rod 14 is shown in FIG. 10 as having been pulled up to the unlocked position when the actuator was in the power locked-neutral position of FIG. 9. This might be done by a key from the vehicle exterior, and the operator would feel little resistance since all that would happen would be that pin 42 would move to the lower end of slot 16. Motor 26 would be unaffected. Although not specifically illustrated, it will be readily understood that if lock rod 14 were manually shifted down to the locked position when the actuator 10 was in the power unlocked neutral mode, it would also occur without resistance, since the pin 42 would move to the upper end of slot 16. So, motor 26 is essentially completely isolated from manual operation.

Referring next to FIGS. 10 through 14, it will be seen that lock rod 14 could not be power locked from the FIG. 10 position, since the secondary shaft 32 is already at its lower motion limit, that is, the outer surface of lower bumper 38 is already against the end of the lower bearing 18. The operator could easily reset the actuator 10 simply by always manually pushing lock rod 14 back down to the locked position after it had been manually unlocked, and vice versa. In the preferred embodiment, however, a means is provided for automatically resetting actuator 10 after manual unlocking or locking. As noted above, the sensors 22 and 24 note the locked or unlocked position of the lock rod 14, whether it has been manually or power moved Suitable control circuitry, indicated schematically at 44 could keep track of that position as well as keep track of the operation and direction of motor 26 to determine whether lock rod 14 had in fact been shifted manually, that is, without using actuator 10. The control circuitry 44 would be programmed to then automatically run the actuator 10 through a phantom cycle in order to reset the actuator 10. For example, in FIGS. 11 through 14, actuator 10 is shown running automatically through a phantom unlocking cycle. This has the effect of resetting actuator 10 to the power unlocked-neutral mode, FIG. 14, that is, to the neutral mode opposite to that in which the actuator 10 was just prior to the lock rod 14 having been manually unlocked. From the FIG. 14 position, lock rod 14 can be power locked. Although not illustrated, the reverse would be done if lock rod 14 were manually shifted to the locked position when the actuator 10 was in the power unlocked-neutral mode.

Variations of the preferred embodiment disclosed may be made. For example, the sensors 22 and 24 and control circuitry 44 are not necessary if the operator is willing to manually reset the actuator 10. The lock rod 14 could be moved by any pair of catches that were separated by the throw T, such as a pair of projections on lock rod 14 that were engageable with the ends of pin block 40. The slot 16 and pin 42 are compact and convenient, however. Stop surfaces fixed to housing 12 other than the ends of the bearings 18 and 20 could be used to provide the limits of motion for secondary shaft 32. It is compact and simple to use the ends of the shaft bearings 18 and 20 to provide that additional function, however. Therefore, it will be understood that it is not intended to limit the invention to just the preferred embodiment disclosed.

The embodiments of the invention in which an exclusive property or privilege is claimed are defined as follows:

1. An actuator for a power door lock system of the type that has a reversible motor and an axially slidable lock rod that is manually movable over a predetermined throw between locked and unlocked positions, said actuator comprising, a main shaft that has an external first stage thread of one hand and which is turned by said motor, a secondary shaft that is internally threaded to move axially back and forth on said first stage thread and which has an external second stage thread of the opposite hand, a drive member that is internally threaded to move axially back and forth on said second stage thread, first and second bumpers fixed to said secondary shaft so as to define first and second limits of motion of said drive member on said secondary shaft, first and second fixed stop surfaces defining first and second limits of motion of said secondary shaft on said main shaft, and, a first catch located on said lock rod so as to be engageable with said drive member when said lock rod is in its locked position, said drive member is at its first limit of motion, and said secondary shaft is at its second limit of motion, thereby defining a power locked-neutral mode of said actuator, and, a second catch on said lock rod spaced from said first catch by substantially said throw so as to be engageable with said drive member when said lock rod is in its unlocked position, said drive member is at its second limit of motion, and said secondary shaft is at its first limit of motion, thereby defining a power unlocked-neutral mode of said actuator, whereby, if said motor runs in one direction when said actuator is in said power locked-neutral mode, said secondary shaft moves on said first stage thread in one axial direction to its first limit of motion, thereby moving said lock rod to its unlocked position, after which said drive member moves on said second stage thread to its second limit of motion, and conversely if said actuator is in said power unlocked-neutral mode and said motor runs in the opposite direction, said lock rod thereby being manually movable to the opposite position when said actuator is in either neutral mode without substantial resistance.

2. An actuator for a power door lock system of the type that has a reversible motor and an axially slidable lock rod that is manually movable over a predetermined throw between locked and unlocked positions, said actuator comprising, an actuator housing to which said motor is mounted, a main shaft that has an external first stage thread of one hand and which is turned by said motor, a secondary shaft that is internally threaded to move axially back and forth on said first stage thread and which has an external second stage thread of the opposite hand, a pin block of a predetermined axial length and having first and second ends that is internally threaded to move axially back and forth on said second stage thread and which also includes a pin projecting therefrom substantially normal to said main shaft axis, first and second bumpers fixed to said secondary shaft having axially facing inner surfaces engageable with said first and second pin block ends respectively and spaced apart by substantially said throw plus said pin block length, first and second axially facing stop surfaces on said housing engageable with the outer surfaces of said bumpers and spaced apart by substantially said throw plus said pin block length plus the thickness of said bumpers, and, a slot in said lock rod through which said pin is received having first and second ends and a length substantially equal to said throw plus the diameter of said pin, said slot further being located in said lock rod such that when said actuator is in a power locked-neutral mode with said second stop surface and said second bumper outer surface engaged and with said first pin block end and said first bumper inner surface engaged, then said pin rests at said slot first end, whereby, if said motor runs in one direction when said actuator is in said power locked-neutral mode, said secondary shaft moves in one axial direction on said first stage thread until said first stop surface engages said first bumper outer surface, thereby pulling said lock rod to said unlocked position, after which said pin block moves in the opposite axial direction on said second stage thread until said second pin block end engages said second bumper inner surface and said pin rests at said slot second end' defining a power unlocked-neutral mode, and conversely when said motor runs in the opposite direction back to said power locked-neutral mode, said lock rod thereby being manually movable to the opposite position when said actuator is in either neutral mode without substantial resistance.

3. An actuator for a power door lock system of the type that has a reversible motor and an axially slidable lock rod that is manually movable over a predetermined throw between locked and unlocked positions, said actuator comprising, a main shaft that has an external first stage thread of one hand and which is turned by said motor, a secondary shaft that is internally threaded to move axially back and forth on said first stage thread and which has an external second stage thread of the opposite hand, a drive member that is internally threaded to move axially back and forth on said second stage thread, first and second bumpers fixed to said secondary shaft so as to define first and second limits of motion of said drive member on said secondary shaft, first and second fixed stop surfaces defining first and second limits of motion of said secondary shaft on said main shaft, and, a first catch located on said lock rod so as to be engageable with said drive member when said lock rod is in its locked position, said drive member is at its first limit of motion, and said secondary shaft is at its second limit of motion, thereby define a power locked-neutral mode of said actuator, and, a second catch on said lock rod spaced from said first catch by substantially said throw so as to be engageable with said drive member when said lock rod is in its unlocked position, said drive member is at its second limit of motion, and said secondary shaft is at its first limit of motion, thereby defining a power unlocked-neutral mode of said actuator, whereby, if said motor runs in one direction when said actuator is in said power locked-neutral mode, said secondary shaft moves on said first stage thread in one axial direction to its first limit of motion, thereby moving said lock rod to its unlocked position, after which said drive member moves on said second stage thread to its second limit of motion, and conversely if said actuator is in said power unlocked-neutral mode and said motor runs in the opposite direction, said lock rod thereby being manually movable to the opposite position when said actuator is in either neutral mode without substantial resistance, and, sensor means to detect when said lock rod has been manually moved to the opposite position while said actuator was in a neutral mode and to thereupon run said actuator through a phantom locking or unlocking cycle so as to move said actuator to the opposite neutral mode and reset it for subsequent operation.

* * * * *